US012235656B2

(12) United States Patent
Fendt

(10) Patent No.: US 12,235,656 B2
(45) Date of Patent: Feb. 25, 2025

(54) METHOD FOR THE AUTONOMOUS OPERATION OF A FOLLOWING VEHICLE IN A VEHICLE TRAIN

(71) Applicant: Conti Temic microelectronic GmbH, Nuremberg (DE)

(72) Inventor: Günter Anton Fendt, Schrobenhausen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 424 days.

(21) Appl. No.: 16/949,808

(22) Filed: Nov. 15, 2020

(65) Prior Publication Data

US 2021/0072768 A1 Mar. 11, 2021

Related U.S. Application Data

(63) Continuation of application No. PCT/DE2019/200041, filed on May 14, 2019.

(30) Foreign Application Priority Data

May 15, 2018 (DE) .................... 10 2018 207 533.6

(51) Int. Cl.
  *G05D 1/246* (2024.01)
  *G05D 1/00* (2006.01)
  *G06V 20/58* (2022.01)
(52) U.S. Cl.
  CPC ......... *G05D 1/0295* (2013.01); *G05D 1/0246* (2013.01); *G05D 1/0293* (2013.01); *G06V 20/584* (2022.01)

(58) Field of Classification Search
  CPC .. G05D 1/0295; G05D 1/0246; G05D 1/0293; G05D 2201/0213; G06K 9/00825
  See application file for complete search history.

(56) References Cited

U.S. PATENT DOCUMENTS

2015/0154871 A1   6/2015 Rothoff
2015/0266488 A1\* 9/2015 Solyom ............ B60W 50/0205
                                                701/28
(Continued)

FOREIGN PATENT DOCUMENTS

CN   102906654 A   1/2013
CN   104700612 A   6/2015
(Continued)

OTHER PUBLICATIONS

German Office Action dated Jan. 3, 2019 for the counterpart German Application No. 10 2018 207 533.6.
(Continued)

Primary Examiner — Vivek D Koppikar
Assistant Examiner — Jeffrey R Chalhoub

(57) ABSTRACT

A method for autonomously operating a following vehicle in a vehicle train together with a vehicle driving ahead of the following vehicle with respect to a direction of travel includes acquiring first route information with a front-mounted sensor. The method also includes operating the following vehicle on the basis of first route information and acquiring second route information with a rear-mounted sensor. The method further includes transmitting the second route information to the following vehicle and, when a substitute criterion is present, operating the following vehicle on the basis of the second route information.

9 Claims, 2 Drawing Sheets

(56) References Cited

U.S. PATENT DOCUMENTS

| | | |
|---|---|---|
| 2016/0071418 A1 | 3/2016 | Oshida et al. |
| 2016/0129908 A1 | 5/2016 | Harda |
| 2016/0318518 A1* | 11/2016 | Suzuki .............. B60W 50/0097 |
| 2017/0168503 A1 | 6/2017 | Amla et al. |
| 2017/0341652 A1 | 11/2017 | Sugawara et al. |
| 2018/0096602 A1 | 4/2018 | She et al. |

FOREIGN PATENT DOCUMENTS

| | | |
|---|---|---|
| CN | 104859662 A | 8/2015 |
| CN | 204595513 U | 8/2015 |
| CN | 105329237 A | 2/2016 |
| CN | 105584481 A | 5/2016 |
| CN | 106483959 A | 3/2017 |
| CN | 106873589 A | 6/2017 |
| CN | 106994969 A | 8/2017 |
| DE | 102015202837 A1 | 8/2015 |
| DE | 102014210147 A1 | 12/2015 |
| DE | 102015213888 A1 | 1/2017 |
| DE | 102016122325 A1 | 5/2018 |
| WO | 2006106009 A1 | 10/2006 |

OTHER PUBLICATIONS

International Search Report and the Written Opinion of the International Searching Authority mailed on Sep. 11, 2019 for the counterpart PCT Application No. PCT/DE2019/2041.

Office Action dated Mar. 20, 2024 of the counterpart CN application No. 201980031662.6.

Office Action dated Aug. 19, 2024 from corresponding Chinese patent application No. 201980031662.6.

Notice of Registration dated Nov. 23, 2024 from corresponding Chinese patent application No. 201980031662.6.

\* cited by examiner

METHOD FOR THE AUTONOMOUS OPERATION OF A FOLLOWING VEHICLE IN A VEHICLE TRAIN

CROSS REFERENCE TO RELATED APPLICATION

This application is a continuation of International application No. PCT/DE2019/200041, filed May 14, 2019, which claims priority to German patent application No. 10 2018 207 533.6, filed May 15, 2018, each of which is hereby incorporated by reference.

TECHNICAL FIELD

The technical field relates to a method for autonomously operating a following vehicle in a vehicle train.

BACKGROUND

The topic of autonomous driving is becoming increasingly important. During autonomous driving, vehicles are controlled or operated based on route information acquired with sensors such as the course of the route, obstacles on the roadway or the like. For reliable functionality of the autonomous vehicle operation, the function of a sensor directed forwards with respect to the direction of travel is very important, so that the position of the following vehicle with regard to the vehicle driving ahead can be determined, for example, and the following vehicle can be operated accordingly, for example it can be oriented to the vehicle driving ahead.

As such, it is desirable to present a method for the autonomous operation of a vehicle, which increases safety during autonomous vehicle operation. In addition, other desirable features and characteristics will become apparent from the subsequent summary and detailed description, and the appended claims, taken in conjunction with the accompanying drawings and this background.

BRIEF SUMMARY

According to one embodiment, a method for autonomously operating a following vehicle in a vehicle train is provided. The following vehicle and a vehicle driving ahead of the following vehicle with respect to a direction of travel form the vehicle train.

In one embodiment, first route information is acquired with a front-mounted sensor, directed forwards with respect to the direction of travel, of the following vehicle. The first route information contains data about the surroundings lying ahead of the vehicle with respect to the direction of travel such as, for example, data about a distance of the vehicle from the roadside, data regarding the course of the road lying ahead, data about a distance from a vehicle driving ahead or similar data.

During autonomous vehicle operation, the vehicle referred to as the following vehicle is operated on the basis of the first route information. That means a change in direction or the steering of the vehicle and/or the acceleration or braking of the vehicle is/are prompted on the basis of the first route information, for example by a control device which is intended to actuate the corresponding components of the vehicle.

Furthermore, second route information is acquired with a rear-mounted sensor, directed rearwards with respect to the direction of travel, of the vehicle driving ahead. A vehicle driving ahead of the following vehicle with respect to the direction of travel of the following vehicle accordingly has a rear-mounted sensor which is configured to acquire second route information. The second route information includes data about the surroundings lying behind the vehicle driving ahead with respect to the direction of travel such as, for example, data about a distance of the vehicle from the roadside, data regarding the course of the road, and data about a position of an object located in the field of view of the rear-mounted sensor relative to the vehicle driving ahead and/or relative to the roadside. As a consequence, a position of the following vehicle relative to the vehicle driving ahead and, optionally, relative to the roadside can be acquired, if the following vehicle is located in the field of view of the rear-mounted sensor.

The second route information acquired with the rear-mounted sensor is transmitted to the following vehicle. Thus, the following vehicle obtains information about the surroundings lying ahead of it with respect to the direction of travel, which was not however determined with the front-mounted sensor, but with the rear-mounted sensor of the vehicle driving ahead. The first and the second route information therefore form at least partially redundant information.

The term "rear-mounted sensor" can in particular be understood in such a way that this term should, in general, also denote a sensor, the working direction of which is predominantly directed rearwards with respect to the direction of travel of the respective vehicle such as, for example, a sensor, in particular a camera which is arranged laterally and/or in the rear region of the vehicle, and is configured in order to be able to acquire or to monitor the region lying behind the vehicle in certain areas.

According to one embodiment, when a substitute criterion is present, the following vehicle is operated on the basis of the second route information. That means a change in direction or the steering of the vehicle and/or the acceleration or braking of the vehicle is/are prompted on the basis of the second route information, for example by the control device indicated above.

Thus, in specific situations, alternatively to the route information determined with a front-mounted sensor of the following vehicle, the route information of a rear-mounted sensor of the vehicle driving ahead, in order to operate the following vehicle autonomously. Here, data are exchanged via car-to-car communication, wherein at least the data determined with the rear-mounted sensor are transmitted to the following vehicle.

Thanks to the utilization of the data of the rear-mounted sensor of the vehicle driving ahead, which contains at least information about the position of the following vehicle relative to the vehicle driving ahead, additional route information is available to the following vehicle. As a result, the reliability of the autonomous vehicle operation is increased since, in the event of the front-mounted sensor of the following vehicle failing, the data of the rear-mounted sensor of the vehicle driving ahead continue to be present and make possible autonomous operation.

According to one embodiment, the substitute criterion is met in one or more of the following cases:
 a. operational failure of the front-mounted sensor of the following vehicle;
 b. detection of the vehicle driving ahead by the following vehicle;
 c. detection of a control signal produced by the vehicle driving ahead by the following vehicle.

According to this embodiment, the following vehicle is exclusively controlled on the basis of the second route information which is acquired with the rear-mounted sensor of the vehicle driving ahead. Here, the decision regarding the exclusive utilization of the second route information is made based on the substitute criterion. The latter can in particular be met if a defect in the front-mounted sensor of the following vehicle occurs. For example, a defect or operational failure is present if the front-mounted sensor does not provide any more data over a predetermined period of time or if the data supplied are inconsistent. The substitute criterion can also be met if the vehicle driving ahead is detected by the following vehicle. In the case of this variant, the data of the vehicle driving ahead are only automatically utilized if the latter is recognized by the following vehicle. Furthermore, the substitute criterion can also be met by a control signal which is produced by the vehicle driving ahead. Here, the vehicle driving ahead connects its second route information, which is acquired with the rear-mounted sensor, to the following vehicle to a certain extent.

The term "exclusively controlled on the basis of the second route information which is acquired with the rear-mounted sensor of the vehicle driving ahead" is to be understood to mean that instead of the first route information, second route information is used as an alternative, wherein the inclusion of further route information such as, for example, information regarding a present speed limit originating from car-to-car communication and/or car-to-infrastructure communication is of course not excluded or can equally be considered as well.

According to a further embodiment, the second route information is only transmitted to the following vehicle when the substitute criterion is present. That means that a data exchange regarding the second route information between the vehicle driving ahead and the following vehicle is not activated until the substitute criterion is present.

According to a further embodiment, the vehicle driving ahead is detected by the following vehicle.

Optionally, the following vehicle is operated in such a manner that the latter forms a vehicle train with the vehicle driving ahead if the latter is detected. This can, for example, comprise a change in direction and/or change in speed of the following vehicle such that the latter positions itself behind the vehicle driving ahead.

According to this embodiment of the method, a vehicle train is first formed. Here, one of the vehicles is operated in autonomous vehicle operation, wherein first route data are acquired with the front-mounted sensor. Said vehicle detects or recognizes a further vehicle if it enters the proximity thereof. The vehicle subsequently positions itself behind the recognized vehicle on the basis of the first route information with respect to the direction of travel, that is to say it is operated on the basis of the route information such that it forms a following vehicle.

The detection can in particular take place based on an evaluation of the first route information. Here, the route information is evaluated, for example with an existing software program on the control device, which software program is intended to recognize a vehicle located in the field of view of the sensor from a data set acquired with the front-mounted sensor. The advantage of this is that no additional data have to be acquired in order to detect the vehicle driving ahead.

According to an embodiment, the detection of the vehicle driving ahead comprises acquiring a recognition signal of the vehicle driving ahead. For example, a transmitter can be provided on the vehicle driving ahead, which outputs an electromagnetic or visual signal which contains the information that the vehicle has a rear-mounted sensor and is configured to transmit the information acquired with the rear-mounted sensor. The recognition signal can also be contained in the first route information, for example the aforementioned software program can be intended to additionally recognize that the vehicle driving ahead has a rear-mounted sensor from a data set acquired with the front-mounted sensor of the following vehicle.

According to an embodiment of the method, a camera is used, for example a CMOS camera or a CCD camera, as a front-mounted sensor and/or as a rear-mounted sensor. The advantage of this is that a plurality of different information can be simply determined with image processing algorithms from the acquired route information.

According to an embodiment, the following vehicle is only operated on the basis of the second route information if, in addition to the substitute criterion, a safety criterion is present. The question of whether the distance between the vehicle driving ahead and the following vehicle lies within a predetermined region, for example between 3 meters and 30 meters can, for example, be enlisted as a safety criterion. In this way, it is ensured that it is possible to operate the following vehicle on the basis of the second route information with sufficient safety.

The above configurations and further developments can be combined at will with one another, provided this makes sense. Further possible configurations, further developments and implementations of the invention also comprise combinations of features of the invention, described above or below with regard to the exemplary embodiments, which are not explicitly indicated. In particular, the person skilled in the art will also add individual aspects as improvements or additions to the respective basic form of the present invention.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

Figure 1:
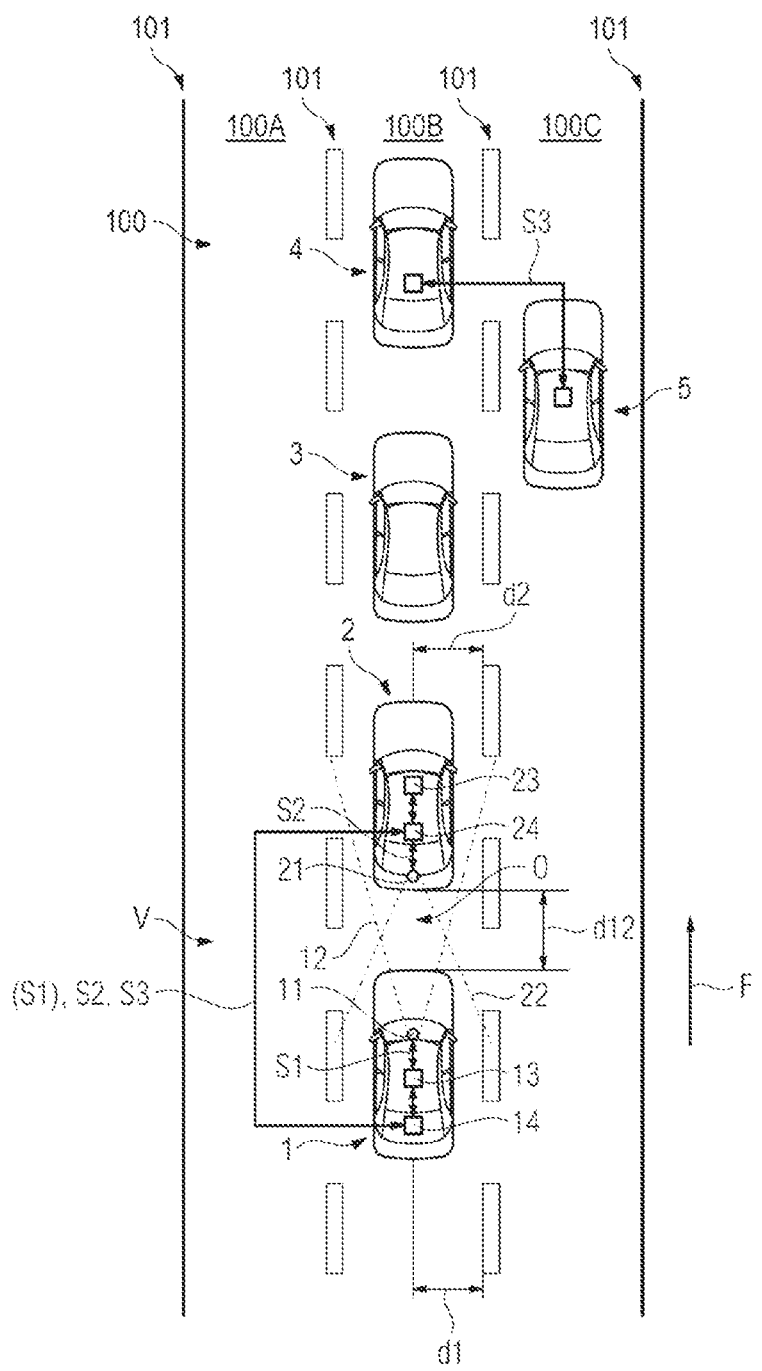
FIG. 1 shows a schematic view of a vehicle train having a vehicle driving ahead and a following vehicle, wherein the following vehicle is operated according to a method of the present invention.

The appended drawings are intended to convey a further understanding of the embodiments. They illustrate embodiments and, in connection with the description, serve to explain principles and concepts of the disclosure. Other embodiments and many of the indicated advantages are set out with regard to the drawings. The elements of the drawings are not necessarily shown true to scale with respect to one another.

In the figures of the drawing, elements, features and components which are similar, functionally similar and act similarly are—unless otherwise indicated—each provided with the same reference numerals.

DETAILED DESCRIPTION

FIG. 1 shows, by way of example, a vehicle train V which has a first vehicle 1 driving in a direction of travel F and a second vehicle 2 which is likewise driving in the direction of travel F. As can be seen in FIG. 1, the first vehicle 1 is positioned behind the second vehicle 2 with respect to the direction of travel F and therefore forms a following vehicle with respect to the direction of travel F. The second vehicle 2 is positioned ahead of the first vehicle 1 with respect to the direction of travel F and accordingly forms a vehicle driving ahead of the first vehicle 1 with respect to the direction of travel F. The vehicle train V shown by way of example in FIG. 1 has, in addition, a third vehicle 3 and a fourth vehicle 4 which are, in each case, both arranged ahead of the second vehicle 2 with respect to the direction of travel F. The second vehicle 2 forms a following vehicle with respect to the third vehicle 3. The third vehicle 3 forms a vehicle driving ahead with respect to the second vehicle 2 and a following vehicle with respect to the fourth vehicle 4. The fourth vehicle 4 forms a vehicle driving ahead with respect to the third vehicle 3.

A road 100 having three lanes 100A, 100B, 100C lying next to one another, which are each delimited by a lateral lane boundary 101, is shown by way of example in FIG. 1. Here, the vehicles 1, 2, 3, 4 of the vehicle train V are all driving behind one another in the same lane, for example the middle lane 100B as depicted in FIG. 1. A further, fifth vehicle 5 which is driving on the lateral lane 100C is depicted by way of example in FIG. 1.

The second vehicle 2 will be simply referred to below as the vehicle driving ahead, and the first vehicle 1 as the following vehicle. However, all of the features apply generally to the following vehicles and the vehicles driving ahead of the vehicle train V.

As depicted in FIG. 1, the following vehicle 1 has a front-mounted sensor 11 which has a field of view 12 directed forwards with respect to the direction of travel F. The front-mounted sensor 11 can in particular be formed by a camera such as, for example, a CMOS camera or a CCD camera. First route information S1 such as, for example, a distance d1 of the following vehicle 1 from a lateral lane boundary 101 or a distance d12 from the vehicle driving ahead 2 or, generally, a relative position of the following vehicle 1 relative to the vehicle driving ahead 2 is acquired with the front-mounted sensor 11.

The first route information S1 acquired with the front-mounted sensor 11 is transmitted to a control device 13 of the following vehicle 1, which is designed to operate the following vehicle 1 on the basis of the first route information S1. In particular, the control device 13 comprises a data memory and a processor which is designed to run software routines stored in the data memory. These are designed to evaluate the first route information and prompt the processor to produce corresponding control signals in order to actuate chassis and drive components of the vehicle such as, e.g., the brakes, the steering, or the engine.

As is furthermore schematically shown in FIG. 1, the following vehicle 1 has a communication interface 14 which is designed to receive data from a communication interface 24 of the vehicle driving ahead 2 and optionally to transmit said data to the latter. The communication interfaces 14, 24 are in each case realized as wireless interfaces, in particular as radio interfaces such as e.g. WLAN or UMTS interfaces.

The second vehicle driving ahead 2 has a rear-mounted sensor 21 and optionally a front-mounted sensor (not shown). The rear-mounted sensor 21 has a field of view 22 directed rearwards, that is to say in the direction of the first vehicle 1 with respect to the direction of travel F. The rear-mounted sensor 21 may be realized by a camera such as, for example, a CMOS camera or a CCD camera. Second route information S2 such as, for example, a distance d2 of the vehicle driving ahead 2 from a lateral lane boundary 101 or a distance d12 from the following vehicle 1 or generally a relative position of the following vehicle 1 relative to the vehicle driving ahead 2, is acquired with the rear-mounted sensor 21. The second route information S2 is consequently at least partially identical to the first route information S1.

The second route information S2 acquired with the rear-mounted sensor 21 is transmitted via the communication interface 24 of the vehicle driving ahead 2 to the communication interface 14 of the following vehicle 1. The second route information S2 is therefore made available to the control device 13 of the following vehicle 1, wherein the control device 13 is designed to operate the following vehicle 1 on the basis of the second route information S2.

According to one embodiment of the method, it is provided that when a substitute criterion is present, the following vehicle 1 is operated on the basis of the second route information S2.

The vehicle driving ahead 2 can itself likewise have a control device 23 which is intended to control the vehicle driving ahead on the basis of first route information acquired with the optional front-mounted sensor (not depicted) of the vehicle driving ahead 2 and/or the second route information S2 received via the communication interface of the vehicle 3 driving immediately ahead of the latter, which is acquired by a rear-mounted sensor (not shown) of the third vehicle 3.

Figure 2:
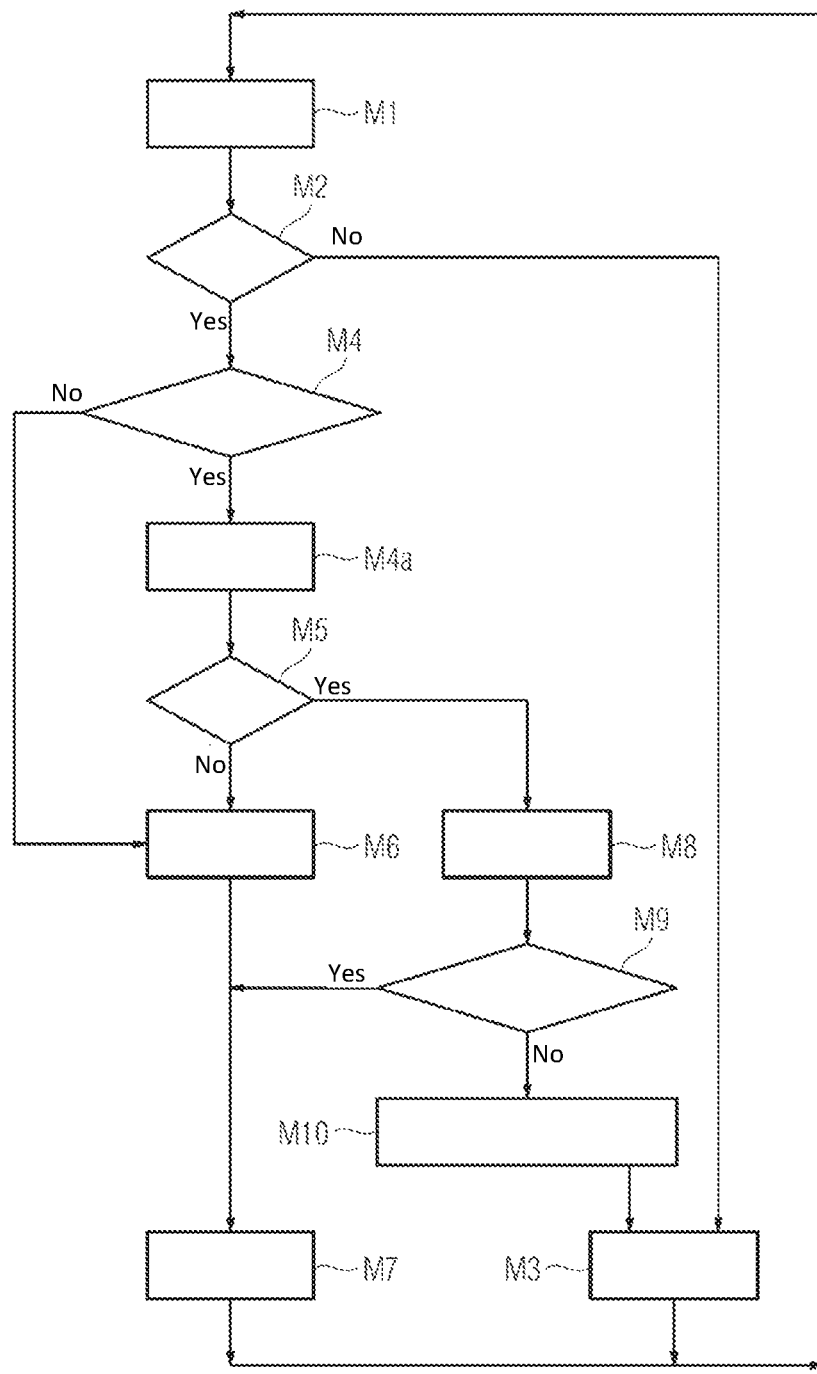
FIG. 2 shows a flow chart of an exemplary embodiment of the method according to the present invention.

FIG. 2 shows, schematically and by way of example, the process of the method according to one embodiment.

At M1, the following vehicle 1 is put into operation. At M2, it is checked whether clearance is provided for autonomous vehicle operation of the vehicle 1. Here, it is for example checked whether the road 100, on which the vehicle 1 is located, is suitable or intended for autonomous vehicle operation, and/or whether the vehicle operator has authorized autonomous vehicle operation. Here, it can be checked, for example, whether the lane boundaries 101 can be recognized at all with the front-mounted sensor 11 of the vehicle 1. If the result is negative ("no"), the vehicle is operated manually by the vehicle operator as depicted symbolically by the block M3.

If the result in M2 is "yes", the vehicle 1 is cleared for autonomous vehicle operation.

At M4, it is verified whether the vehicle 1 forms a following vehicle 1 of a vehicle train V. Here, a detection of the vehicle driving ahead 2 can for example take place. The detection can, for example, be performed based on an evaluation of the first route information S1. For example, the data acquired with the front-mounted sensor 11 can be searched by the control unit 13 for the presence of information which represents the existence of a vehicle 2 in the field of view 12 of the front-mounted sensor 11. Alternatively or additionally, it can also be provided that the detection comprises acquiring a recognition signal S3 of the vehicle driving ahead 2. For example, the vehicle driving ahead 2 can constantly output, via a transmitter (not depicted), an electromagnetic signal S3 which identifies the vehicle driving ahead 2 and which can be detected by the following vehicle 1, for example via the communication interface 14.

If no vehicle driving ahead 2 is detected ("no"), the vehicle 1 is operated on the basis of the first route information S1 acquired with the front-mounted sensor 11, as depicted symbolically in FIG. 2 by the block M6. The result is that the vehicle 1 is operated in autonomous vehicle operation, as depicted by block M7. In autonomous vehicle operation, the vehicle 1 is generally operated on the basis of first or second route information S1, S2, for example with the aid of the control device 13.

If a vehicle driving ahead 2 is detected ("yes"), the vehicle 1 continues to be operated, in principle, on the basis of the first route information S1 acquired with the front-mounted sensor 11, as the following vehicle 1. Optionally, the vehicle 1 can initially be operated in such a manner that the latter forms a vehicle train V with the vehicle driving ahead (at M4a). For example, in FIG. 1, the fifth vehicle 5 can detect the fourth vehicle 4, e.g., by receiving a corresponding recognition signal S3 of the fourth vehicle 4 and/or based on route information acquired with the front-mounted sensor (not shown) of the fifth vehicle 5, and can go into the lane behind the fourth vehicle 4 or between the third vehicle 3 and the fourth vehicle 4. Furthermore, second route information S2 is acquired by the rear-mounted sensor 21 of the vehicle driving ahead 2 in the vehicle train V, as described above. In the situation of a vehicle train V, which is shown in FIG. 1, in which the following vehicle 1 is driving behind the vehicle driving ahead 2 with respect to the direction of travel F, the field of vision 12 of the front-mounted sensor 11 of the following vehicle 1 and the field of vision 22 of the rear-mounted sensor 21 of the vehicle driving ahead 2 overlap in an overlap region O. Accordingly, the first and the second route information S1, S2 are at least partially redundant.

As is furthermore depicted symbolically in FIG. 2, a verification of the presence of a substitute criterion takes place at M5. The substitute criterion can in particular be met by an operational failure of the front-mounted sensor 11 of the following vehicle 1. Alternatively, the substitute criterion can also already be met by the detection of the vehicle driving ahead 2 by the following vehicle 1 or by a control signal produced by the vehicle driving ahead 2, which includes the information for the following vehicle 1 that the vehicle driving ahead 2 is acquiring second route information S2 with a rear-mounted sensor 21 and is designed to provide the second route information S2 to the communication interface 24. If the substitute criterion is not present, e.g., because the front-mounted sensor 11 of the following vehicle 11 is working properly, the result of the verification at M6 is "no" and the following vehicle 1 continues to be operated (block M6) on the basis of the first route information S1 which is acquired by the front-mounted sensor 11. As a result, the vehicle 1 is operated in autonomous vehicle operation (block M7)

If the substitute criterion is present, e.g., because the front-mounted sensor 11 of the following vehicle 1 fails, then the result of the verification at M5 is "yes", and the following vehicle 1 is operated on the basis of the second route information S2 which is acquired by the rear-mounted sensor 21 of the vehicle driving ahead 2 and is transmitted to the following vehicle. This is symbolized by the block M8. During the transmission of the second route information S2, this is transferred via the communication interface 24 of the vehicle driving ahead 2 to the communication interface 14 of the following vehicle 1 and thus supplied to the control device 13 of the following vehicle 1, which operates the following vehicle 1 on the basis of said second route information S2. Optionally, the second route information S2 is only transmitted to the following vehicle 1 when the substitute criterion is present. Alternatively, a continual transmission can take place for as long as the vehicle driving ahead 2 and the following vehicle 1 form a vehicle train V.

The result at M8 is an autonomous vehicle operation (block M7), in which the following vehicle 1 is operated on the basis of the second route information S2. Optionally, a verification takes place beforehand at M9 as to whether a safety criterion is present. The safety criterion can in particular be formed by the distance d12 between the vehicle driving ahead and the following vehicle 2, 1 and is met if the distance d12 lies in a predetermined region, for example between 3 meters and 30 meters. Alternatively, the safety criterion can be formed by the field of view 24 of the rear-mounted sensor 21 and is met if the rear-mounted sensor 21 supplies data at least from a predetermined partial region of the field of view 24. If the result of the verification at M9 is "yes", i.e., the safety criterion is met, the following vehicle 1 is operated on the basis of the second route information S2 in autonomous vehicle operation (block M7). If the result of the verification at M9 is "no", i.e., the safety criterion is not met, a change M10 is made to manual vehicle operation and the vehicle is operated manually by the vehicle operator, as depicted symbolically by the block M3.

Although the present invention has been described above in full based on preferred exemplary embodiments, it is not restricted thereto, but can be modified in many ways. The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for autonomously operating a following vehicle in a vehicle train together with a vehicle driving ahead of the following vehicle with respect to a direction of travel, the method comprising:
   acquiring first route information with a front-mounted sensor, directed forwards with respect to the direction of travel, of the following vehicle, wherein the first route information includes at least one of a distance of the following vehicle from a lateral lane boundary, a distance between the following vehicle and the vehicle driving ahead, and a relative position of the following vehicle to the vehicle driving ahead;
   operating the following vehicle on the basis of the first route information;
   acquiring second route information with a rear-mounted sensor, directed rearwards with respect to the direction of travel, of the vehicle driving ahead, wherein the second route information includes at least one of a distance of the vehicle driving ahead from the lateral lane boundary, a distance between the vehicle driving ahead and the following vehicle, and a relative position of the following vehicle to the vehicle driving ahead;
   transmitting the second route information to the following vehicle; and
   when a substitute criterion is present, operating the following vehicle on the basis of the second route information.

2. The method according to claim 1, wherein the substitute criterion is met in one or more of the following cases:
   operational failure of the front-mounted sensor of the following vehicle;
   detection of the vehicle driving ahead by the following vehicle; and/or
   detection of a control signal produced by the vehicle driving ahead by the following vehicle.

3. The method according to claim 1, wherein the second route information is only transmitted to the following vehicle when the substitute criterion is present.

4. The method according to claim 1, wherein the vehicle driving ahead is additionally detected by the following vehicle.

5. The method according to claim 4, wherein the detection takes place based on an evaluation of the first route information.

6. The method according to claim 4, wherein the detection comprises acquiring a recognition signal of the vehicle driving ahead.

7. The method according to claim 4, wherein the following vehicle is operated in such a manner that the latter forms a vehicle train with the vehicle driving ahead when the latter is detected.

8. The method according to claim 1, wherein a camera is used as a front-mounted sensor and/or as a rear-mounted sensor.

9. The method according to claim 1, wherein the following vehicle is only operated on the basis of the second route information when, in addition to the substitute criterion, a safety criterion is present.

\* \* \* \* \*